No. 788,565. PATENTED MAY 2, 1905.
G. VAN EYCK.
LID FOR JARS OR SIMILAR VESSELS.
APPLICATION FILED JULY 2, 1904.

Witnesses:
Fred Unfricht.
William Schulz.

Inventor:
Georg van Eyck
by his attorney

No. 788,565. Patented May 2, 1905.

UNITED STATES PATENT OFFICE.

GEORG VAN EYCK, OF OEFLINGEN, GERMANY.

LID FOR JARS OR SIMILAR VESSELS.

SPECIFICATION forming part of Letters Patent No. 788,565, dated May 2, 1905.

Application filed July 2, 1904. Serial No. 215,073.

*To all whom it may concern:*

Be it known that I, GEORG VAN EYCK, merchant, a subject of the German Emperor, residing at Oeflingen, in the Grand Duchy of Baden, Germany, have invented a new and useful Lid for Jars or Similar Vessels, of which the following is a full and complete specification.

My invention consists of a combination of the ordinary smooth lid with an arrangement whereby vessels used in sterilizing, preserve-jars, &c., can be rendered air-tight. By this combination the contents of vessels, be they foodstuffs, preparations, instruments, or similar things, can be protected against germs or microbes without shutting out the air, or the contents can by being shut off from the air be protected against decomposition.

Figure 1:
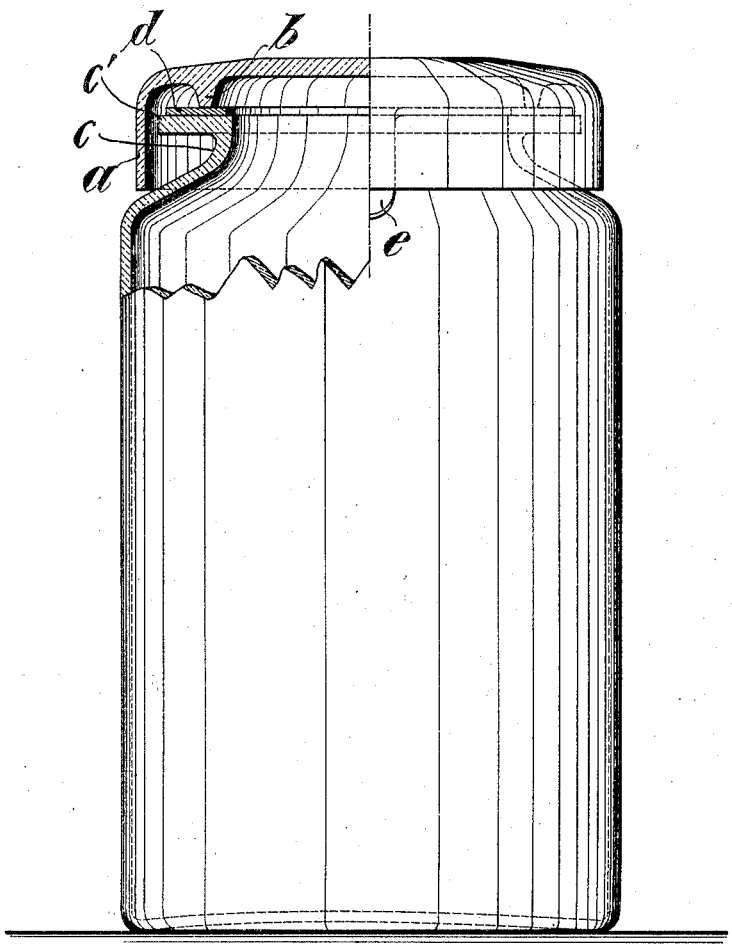
Figure 2:
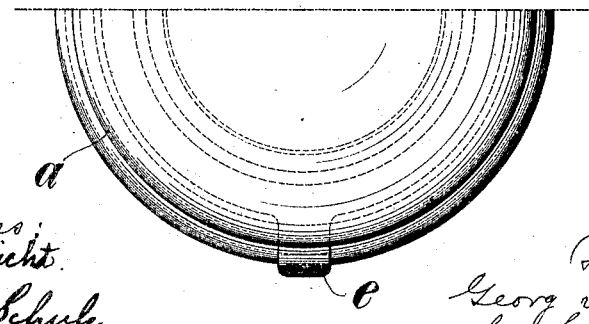

In the accompanying drawings, Figure 1 is a side view, partly in section, of a jar provided with my improved lid; and Fig. 2, a plan of one-half of the lid.

The body of the jar or other vessel has an inwardly-turned neck $c$, terminating in a horizontal flange $c'$. The lid is bell-shaped and provided with a pair of concentric depending rims $a$ and $b$. Of these the outer rim $a$ extends beneath flange $c'$ and into proximity to the neck $c$, so that a first narrow annular opening is formed between the neck and the lower edge of the rim. This opening constitutes the mouth of a chamber formed within the rim and below flange $c'$. The inner diameter of rim $a$ is greater than the outer diameter of flange $c'$, and thus a second annular opening or clearance is formed between rim and flange. The inner rim $b$ is shorter than rim $a$ and bears upon a packing-ring $d$, supported upon flange $c'$.

If it is required to hermetically seal a vessel in sterilizing, procedure is the same as usual; but if the vessel is to be protected only by the smooth lid it is not necessary to use a bath. It will thus be seen that besides offering the advantage of being used one way or the other the invention offers the further advantage that on preserve-jars which have been kept some time being opened all germs can by simply covering with the smooth lid be prevented from entering and bringing about the decomposition of the contents. If a rubber packing-ring is employed for the mouth of the vessel, it may be furnished with a flap $e$ so arranged under the outer ring or rim of the vessel that it can easily be seized, and when the vessel is hermetically closed it is only required to pull at the flap to admit the air, which at once loosens the lid. The lids of the vessels may be round, cornered, or of any desired shape.

Having now fully described my invention, what I claim as new, and desire to secure by Letters Patent, is—

A vessel having a curved neck and an upper flange, combined with a packing and with a lid having an inner rim that extends beneath the bottom of the lid and bears upon the packing, and an outer rim that projects below the inner rim and into proximity to the curved neck, the outer rim being of such a length and diameter that a first annular opening is formed between rim and neck, and a second annular opening is formed between rim and flange, substantially as specified.

Signed by me this 17th day of June, 1904.

GEORG VAN EYCK.

Witnesses:
CARL MOHR,
JEAN GRUND.